(12) United States Patent
Huscher

(10) Patent No.: US 9,909,461 B2
(45) Date of Patent: Mar. 6, 2018

(54) WASTE HEAT RECOVERY SYSTEM

(71) Applicant: BORGWARNER INC., Auburn Hills, MI (US)

(72) Inventor: Frederick M. Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 110 days.

(21) Appl. No.: 14/946,301

(22) Filed: Nov. 19, 2015

(65) Prior Publication Data

US 2017/0145865 A1     May 25, 2017

(51) Int. Cl.
*F01K 23/10*     (2006.01)
*F01K 13/00*     (2006.01)
(Continued)

(52) U.S. Cl.
CPC ............ *F01K 23/10* (2013.01); *F01K 13/003* (2013.01); *F01K 13/02* (2013.01); *F01K 15/02* (2013.01);
(Continued)

(58) Field of Classification Search
CPC ........ F01K 23/10; F01K 13/003; F01K 13/02; F01K 23/065; F28D 15/0266; F28D 21/0003; F28D 15/06
See application file for complete search history.

(56) References Cited

U.S. PATENT DOCUMENTS 4,590,766 A * 5/1986 Striebich ................. F02B 41/10
                                                          60/618
4,768,344 A     9/1988 Stojicic
(Continued)

FOREIGN PATENT DOCUMENTS

AT          239606 B   *   4/1965
CN      205422833 U   *   8/2016
(Continued)

OTHER PUBLICATIONS

Machine Translation of DE 102012204257, Translated on Jul. 3, 2017.*

(Continued)

*Primary Examiner* — Patrick Maines
(74) *Attorney, Agent, or Firm* — Miller, Matthias & Hull LLP

(57) ABSTRACT

A waste heat recovery system is disclosed. The waste heat recovery system may include a turbine expander. The turbine expander may include a turbine blade rotatably coupled to a shaft and the shaft may be rotatably engaged with a nozzle ring. The nozzle ring may include a de Laval-nozzle. The waste heat recovery system may additionally include a pressure sensor. The pressure sensor may be located fluidly upstream of the de Laval-nozzle and fluidly downstream of an evaporator. The pressure sensor may be configured to measure pressure of a working fluid and transmit a working fluid pressure signal. Further, the waste heat recovery system may include an electronic controller. The electronic controller may be configured to receive the working fluid pressure signal and transmit a working fluid flowrate adjustment signal in response to the working fluid pressure signal.

15 Claims, 5 Drawing Sheets

(51) Int. Cl.
      *F01K 13/02*       (2006.01)
      *F01K 23/06*       (2006.01)
      *F28D 15/02*       (2006.01)
      *F28D 21/00*       (2006.01)
      *F28D 15/06*       (2006.01)
      *F01K 15/02*       (2006.01)

(52) U.S. Cl.
      CPC ............ *F01K 23/06* (2013.01); *F01K 23/065* (2013.01); *F28D 15/0266* (2013.01); *F28D 15/06* (2013.01); *F28D 21/0003* (2013.01); *F28D 2015/0291* (2013.01)

(56) References Cited

U.S. PATENT DOCUMENTS

| | | | |
|---|---|---|---|
| 8,678,749 B2 | 3/2014 | Saitoh | |
| 2010/0011766 A1* | 1/2010 | Grundl | F02G 5/02 60/614 |
| 2011/0308252 A1* | 12/2011 | Kopecek | F01K 25/10 60/653 |
| 2013/0058772 A1* | 3/2013 | Hasemann | F01D 1/04 415/202 |
| 2013/0101393 A1 | 4/2013 | Purdum et al. | |
| 2013/0192231 A1* | 8/2013 | Buchler | F01D 1/24 60/722 |
| 2015/0086346 A1* | 3/2015 | Mueller | F01D 1/026 415/202 |

FOREIGN PATENT DOCUMENTS

| | | | | |
|---|---|---|---|---|
| DE | 10 2012 204257 A1 | | 9/2013 | |
| DE | 102012204257 A1 | * | 9/2013 | ............ F01K 23/06 |
| DE | 102014220679 A1 | * | 4/2016 | ............ F02B 37/24 |

OTHER PUBLICATIONS

International Search Report for related International Application No. PCT/US2016/061020; report dated Feb. 20, 2017.

Harald S. Kunte, Joerge R. Seume; "Design of a Partial Admission Impulse Turbine for an Automotive ORC-Application"; Leibniz Universitat Hannover; Institute of Turbomachinery and Fluid Dynamics; Oct. 7, 2013; www.asme-orc2013.nl/uploads/File/PPT%20097.pdf.

* cited by examiner

WASTE HEAT RECOVERY SYSTEM

TECHNICAL FIELD

This disclosure generally relates to an engine system and, more particularly, relates to a waste heat recovery system for an engine system.

BACKGROUND

A waste heat recovery system associated with an engine system may include an evaporator in thermal communication with an exhaust stream of an engine. The evaporator may be configured to absorb thermal energy of the exhaust stream and transfer the thermal energy of the exhaust stream to a working fluid flowing through a working fluid conduit associated with the waste heat recovery system. The waste heat recovery system may additionally include a turbine expander located fluidly downstream of the evaporator that may be configured to produce work as the working fluid passes through the turbine expander. Moreover, this system may include a condenser positioned fluidly downstream of the expander and the condenser may condense the vapor phase working fluid leaving the expander into a liquid phase working fluid. Finally, such a system may include a pump located fluidly downstream of the condenser, but fluidly upstream of the evaporator. The pump may be used to propel the working fluid through the waste heat recovery system.

A key aspect of the efficient control of the waste heat recovery system is measuring, and subsequently adjusting, the working fluid mass flowrate. Customarily, waste heat recovery system designers solve this problem by installing a dedicated mass or volumetric flowrate meter, such a Coriolis flowmeter to measure the working fluid mass flowrate or to measure the volumetric flowrate using a turbine or other type of volumetric flowmeter and then calculate the mass flow rate based on the fluid's thermal state. Each of these options is expensive to undertake.

The present disclosure is directed to overcoming one or more problems set forth above and/or other problems associated with known waste heat recovery systems.

SUMMARY

In accordance with one aspect of the present disclosure, a waste heat recovery system is disclosed. The waste heat recovery system may include a turbine expander. The turbine expander may include a turbine blade rotatably coupled to a shaft and the shaft may be rotatably engaged with a nozzle ring. The nozzle ring may include a de Laval-nozzle. The waste heat recovery system may additionally include a pressure sensor. The pressure sensor may be located fluidly upstream of the de Laval-nozzle and fluidly downstream of an evaporator. The pressure sensor may be configured to measure pressure of a working fluid and transmit a working fluid pressure signal. Further, the waste heat recovery system may include an electronic controller. The electronic controller may be configured to receive the working fluid pressure signal and transmit a working fluid flowrate adjustment signal in response to the working fluid pressure signal.

In accordance with another aspect of the present disclosure, an engine system is disclosed. The engine system may include an engine and an exhaust conduit. The exhaust conduit may be downstream of and fluidly coupled to the engine and be configured to transport an exhaust stream away from the engine. The engine system may additionally include an evaporator. The evaporator may be in thermal communication with the exhaust stream and a turbine expander. The turbine expander may include a nozzle ring including a de Laval-nozzle. Moreover, the engine system may include a working fluid conduit that fluidly couples to the evaporator with the turbine expander. Furthermore, the engine system may include a pressure sensor. The pressure sensor may be operatively associated with the working fluid conduit, and be positioned between the evaporator and the de Laval-nozzle. Moreover, the pressure sensor may be configured to measure the pressure of a working fluid in the working fluid conduit and convey a working fluid pressure signal. In addition, the engine system may include an electronic controller. The electronic controller may be configured to receive the working fluid pressure signal and convey a working fluid flowrate adjustment signal in response to the working fluid pressure signal.

In accordance with another embodiment of the present disclosure, a method of operating a waste heat recovery system is disclosed. The method may include locating a pressure sensor fluidly upstream of a de Laval-nozzle of a turbine expander, and fluidly downstream of an evaporator. The pressure sensor may be configured to measure pressure of a working fluid and transmit a working fluid pressure signal, while the turbine expander may include a turbine blade rotatably coupled to a shaft, and the shaft may be rotatably engaged with a nozzle ring. The nozzle ring may include the de Laval-nozzle. The method may additionally include locating a temperature sensor fluidly upstream of the de Laval-nozzle of the turbine expander, and fluidly downstream of the evaporator. The temperature sensor may be configured to measure temperature of the working fluid and transmit a working fluid temperature signal, while the turbine expander may include the turbine blade rotatably coupled to the shaft, the shaft being rotatably engaged with the nozzle ring and the nozzle ring may include the de Laval-nozzle. In addition, the method may include configuring an electronic controller to receive the working fluid pressure signal and the working fluid temperature signal, calculate a working fluid mass flowrate utilizing the working fluid pressure signal and the working fluid temperature signal, and transmit a working fluid flowrate adjustment signal in response to the working fluid pressure signal and the working fluid temperature signal. Furthermore, the method may include configuring a flow control device to receive the working fluid flowrate adjustment signal and alter the working fluid mass flowrate in response to the working fluid flowrate adjustment signal. Lastly, the method may include determining whether the working fluid flowrate needs adjustment and transmitting the working fluid flowrate adjustment signal to the flow control device when the working fluid mass flowrate needs adjustment.

These and other aspects and features of the present disclosure will be more readily understood when read in conjunction with the accompanying drawings.

BRIEF DESCRIPTION

DETAILED DESCRIPTION OF THE DISCLOSURE

Figure 1:
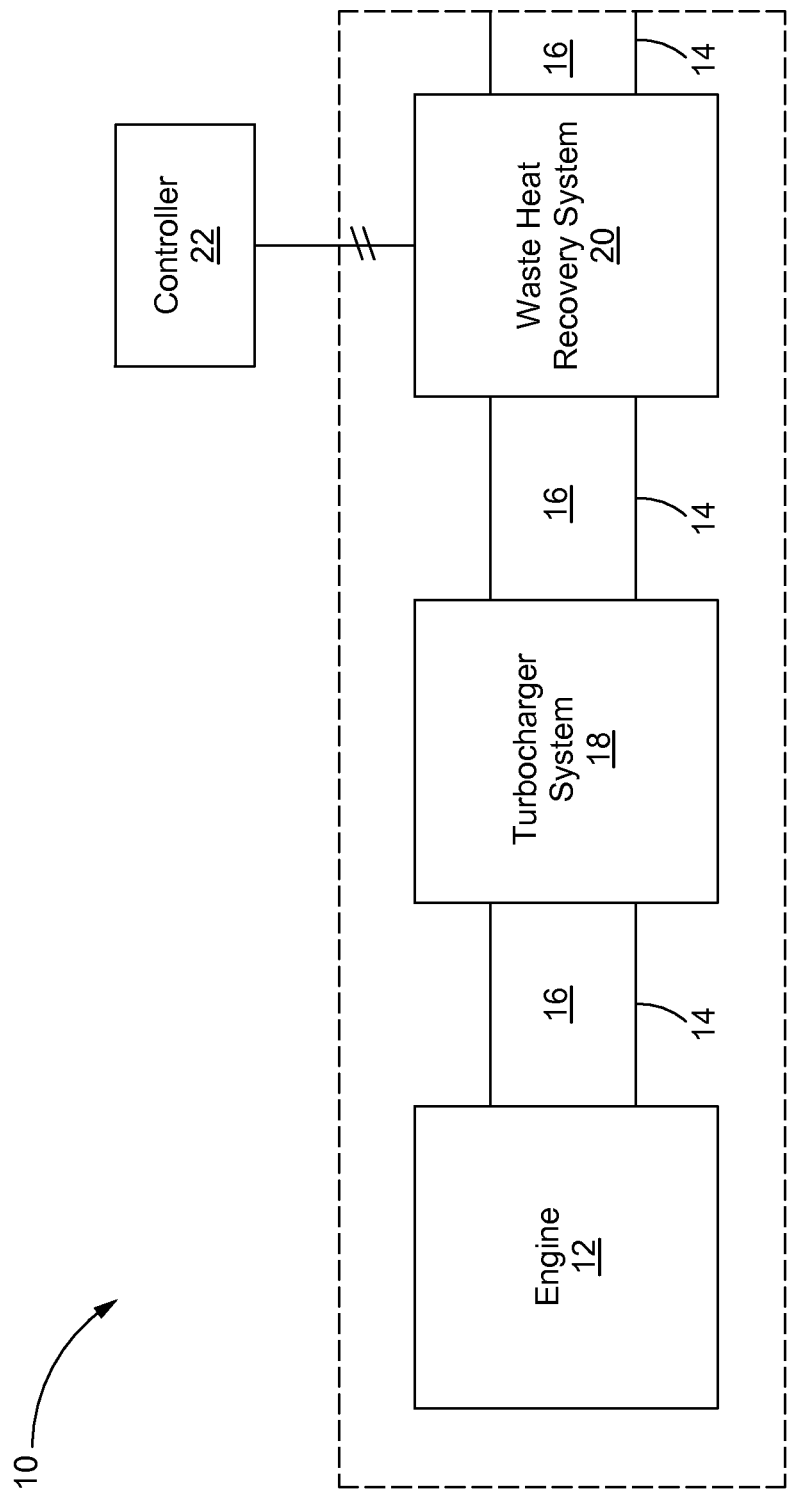
FIG. 1 is a block diagram of an exemplary engine system according to one aspect of the present disclosure.

Various aspects of the disclosure will now be described with reference to the drawings, wherein like reference numbers refer to like elements, unless specified otherwise. Referring to FIG. 1, a block diagram of an exemplary engine system 10 is illustrated, according to an aspect of the disclosure. The engine system 10 may include an engine 12, which may be an internal combustion engine such as a reciprocating piston engine or a gas turbine engine, for example. According to an aspect of the disclosure, the engine 12 is a gas turbine engine, a spark ignition engine or a compression ignition engine such as a diesel engine, or other compression ignition engine 12 known in the art.

The engine 12 may be used to provide power to any machine including, but not limited to, an automobile, marine vehicle, electrical generator, pump, an on-highway truck, an off-highway truck or the like. In one embodiment, the engine 12 may be used to provide power to an on-highway truck. However, engine system 10 may be associated with any industry including, but not limited to, transportation, construction, forestry, agriculture, material handling, shipping and the like. The engine system 10 may include an exhaust conduit 14 downstream of and fluidly coupled to the engine 12. The exhaust conduit 14 may be configured to transport an exhaust stream 16 away from the engine 12. The engine system 10 may also include a turbocharger system 18 that is located fluidly downstream of the engine 12 and is in fluid communication with the exhaust stream 16. The turbocharger system 18 may be configured to extract work from the exhaust stream 16 to increase the pressure of an inlet stream of the engine 12.

The engine system 10 may also include a waste heat recovery system 20. The waste heat recovery system 20 may be located fluidly downstream of the engine 12 and turbocharger system 18. Accordingly, the turbocharger system 18 may be located upstream of the waste heat recovery system 20 along the exhaust conduit 14. The waste heat recovery system 20 may be in thermal communication with the exhaust stream 16. The waste heat recovery system 20 may also include an electronic controller 22 that may be configured to receive a working fluid pressure signal 24 and transmit a working fluid flowrate adjustment signal 26 in response to the working fluid pressure signal 24. The electronic controller 22 may be any type of electronic processor such as a dedicated processor on-board the engine 12 or machine employing the engine 12. Alternatively, the electronic controller 22 may be a stand-alone device specifically associated with the waste heat recovery system 20.

Figure 2:
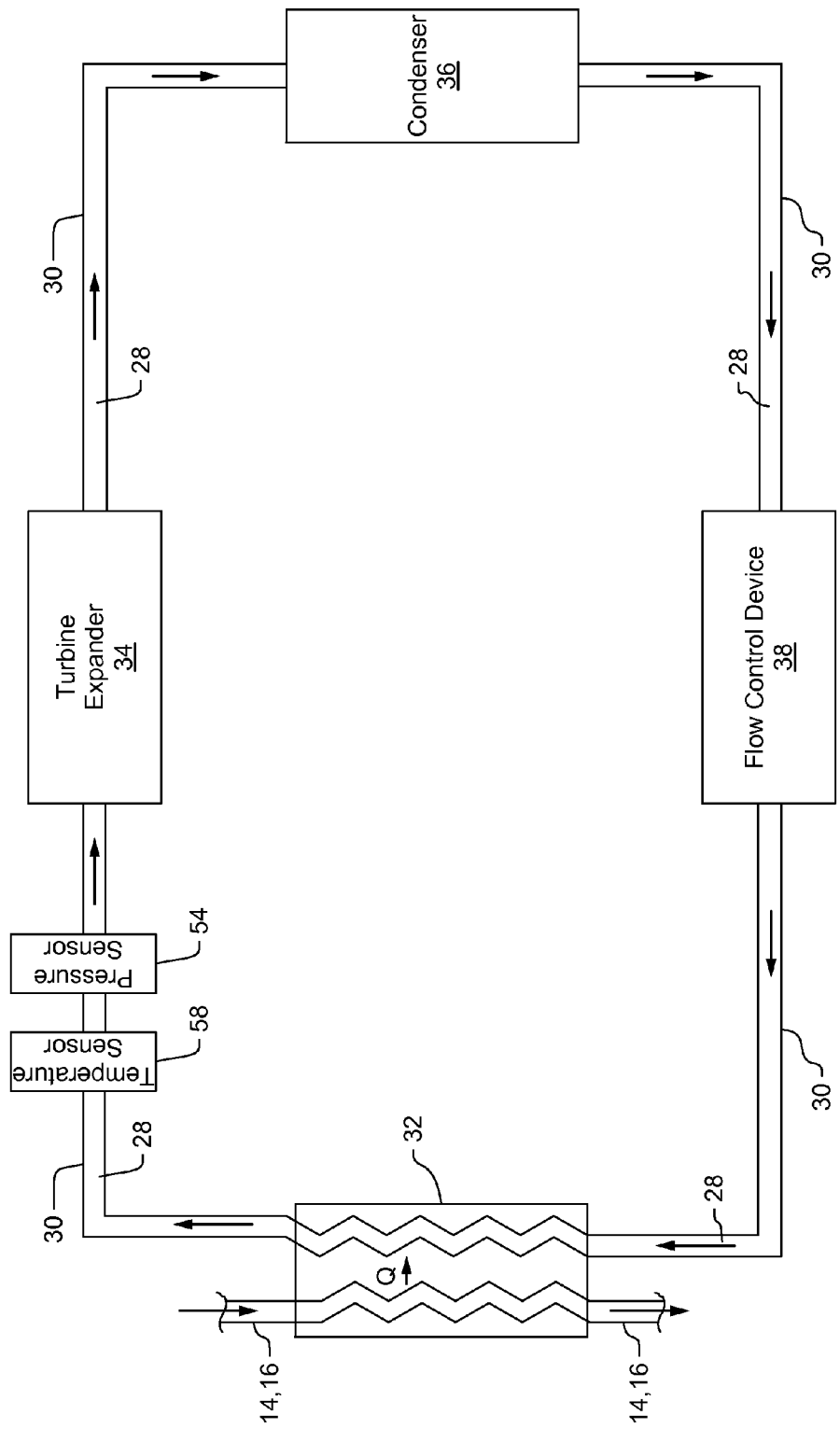
FIG. 2 is a schematic of an exemplary waste heat recovery system according to one aspect of the present disclosure.

An exemplary waste heat recovery system 20 of the present disclosure is depicted in the schematic of FIG. 2. As described above, the waste heat recovery system 20 may be in thermal communication with the exhaust stream 16. More specifically, as seen in FIG. 2, the exhaust stream 16 inside the exhaust conduit 14 may pass heat (Q) from the exhaust stream 16 to a working fluid 28 flowing in a working fluid conduit 30 as the exhaust stream 16 passes through an evaporator 32. Subsequently, the working fluid 28 may continue to move through the waste heat recovery system 20 to a turbine expander 34. The turbine expander 34 may be located fluidly downstream of, and be in fluid communication with, the evaporator 32 by the working fluid conduit 30. The turbine expander 34 may be configured to produce work as the working fluid 28 passes through the turbine expander 34.

Moreover, as seen in FIG. 2, the waste heat recovery system 20 may include a condenser 36 located fluidly downstream of, and in fluid communication with, the turbine expander 34 by the working fluid conduit 30. The condenser 36 may be configured to condense the working fluid 28 in a vapor phase leaving the turbine expander 34, thereby creating working fluid 28 in a liquid phase after leaving the condenser 36. Furthermore, the waste heat recovery system 20 may include a flow control device 38 located fluidly downstream of, and in fluid communication with, the condenser 36 by the working fluid conduit 30. Moreover, as depicted in FIG. 2, the flow control device 38 may be located fluidly upstream of, and be in fluid communication with, the evaporator 32 by the working fluid conduit 30. The flow control device 38 may be configured to adjust the flowrate of the working fluid 28 through the waste heat recovery system 20 at one or more speeds. In one embodiment, the flow control device 38 may be a pump, such as, for example, a piston pump or a diaphragm pump. In another embodiment, the flow control device 38 may be a valve, such as, a butterfly valve or a throttle valve.

Figure 3:
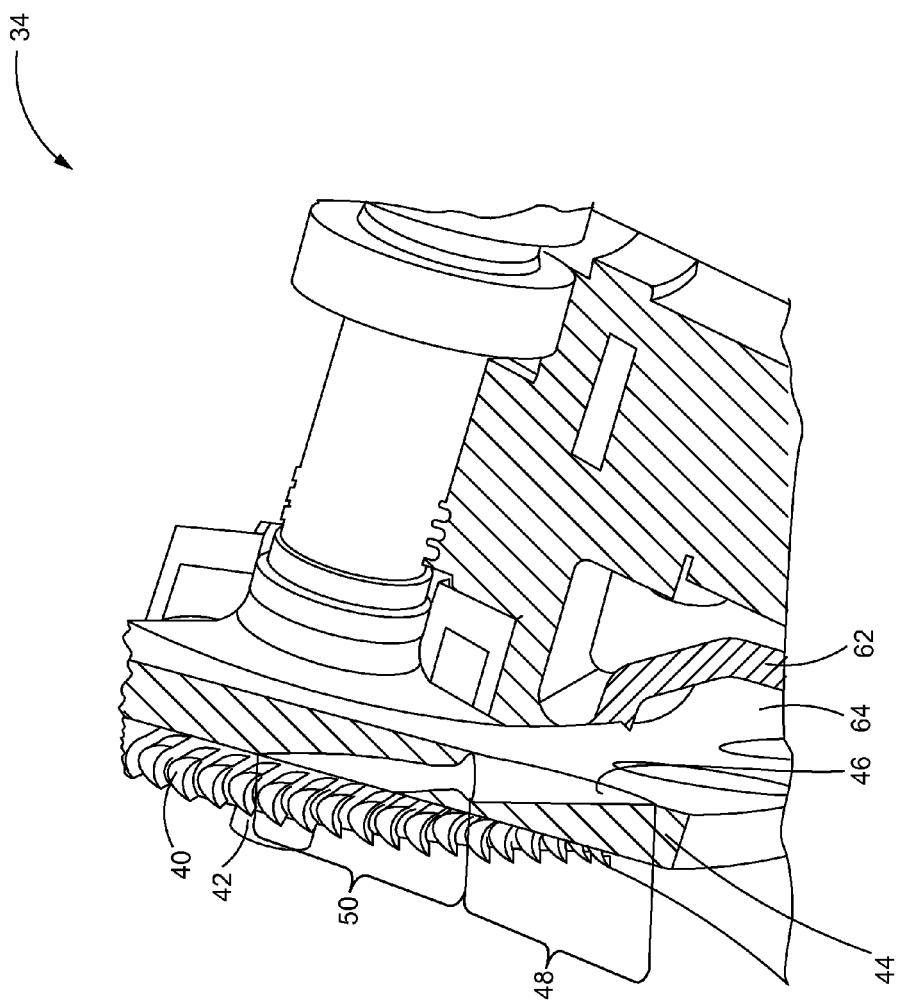
FIG. 3 is a cut-away, partially cross-sectioned view of an exemplary turbine expander that may be utilized with the exemplary waste heat recovery system according to FIG. 2.

Turning now to FIG. 3, a cut-away partially cross-sectioned view of an exemplary turbine expander 34 that may be utilized with the waste heat recovery system 20 of FIG. 2 is illustrated. More specifically, as seen therein, the turbine expander 34 may include a turbine blade 40 that is rotatably coupled to a shaft 42. The shaft 42 may be rotatably engaged with a nozzle ring 44, and the nozzle ring 44 may include a specific type of nozzle, for example, a de Laval-nozzle 46. A de Laval-nozzle 46 is a convergent-divergent type of nozzle. As seen in FIG. 3, the de Laval-nozzle 46 may include a converging section 48 and a diverging section 50. As this turbine expander 34 includes a de Laval-nozzle 46, in one embodiment, the turbine expander 34 may be a partial-admission impulse turbine expander 34.

As described supra, a key aspect of the efficient control of the waste heat recovery system 20 is measuring, and subsequently adjusting, the working fluid mass flowrate 52. Customarily, waste heat recovery system 20 designers solve this problem by utilizing a dedicated mass or volumetric-flowmeter, such as a Coriolis or turbine-type flowmeter. Since the turbine expander 34 depicted in FIG. 3 utilizes a de Laval-nozzle 46, the flow of the working fluid 28 through the de Laval-nozzle 46 is choked at most, it not all operating conditions. Therefore, a simple correlation between the pressure and temperature of the working fluid 28 upstream of the de Laval-nozzle 46 and the working fluid mass flowrate 52 exists. More specifically, in one example, the working fluid mass flowrate 52 may be calculated by equation 1 below:

$$\dot{m} = CA\sqrt{k\rho_0 P_0 \left(\frac{2}{k+1}\right)^{\left(\frac{k+1}{k-1}\right)}}, \quad (1)$$

where $\dot{m}$ is a working fluid mass flowrate 52; C is a known dimensionless discharge coefficient; A is a known discharge hole cross-sectional area; k is a $C_p/C_v$ of the working fluid 28, $C_p$ is a specific heat of the working fluid 28 at constant pressure; $C_v$ is a specific heat of the working fluid 28 at constant volume; $\rho_0$ is a density of the working fluid 28 at total pressure $P_0$ and total temperature $T_0$; $P_0$ is a pressure of the working fluid 28 upstream of the de Laval-nozzle 46; and $T_0$ is the temperature of the working fluid 28 upstream of the de Laval-nozzle 46. Accordingly, the present disclosure eliminates the expense caused by utilizing external flowmeters, relying on the inferred flowrate from the working fluid's thermal state and nozzle characteristics of the de Laval-nozzle 46.

As indicated above, to calculate the working fluid mass flowrate 52, the pressure and temperature of the working fluid 28 upstream of the de Laval-nozzle 46 should be known. More specifically, and turning back to FIG. 2, the pressure and temperature of the working fluid 28 in the section of the working fluid conduit 30 between the evaporator 32 and the turbine expander 34 should be known. Accordingly, the waste heat recovery system 20 according to the present disclosure may additionally include a pressure sensor 54. This pressure sensor 54 may be located fluidly upstream of the de Laval-nozzle 46 and fluidly downstream of the evaporator 32. Further, the pressure sensor 54 may be configured to measure pressure of the working fluid 28 and transmit a working fluid pressure signal 24. Further, as depicted in FIG. 2, the waste heat recovery system 20 may also include a temperature sensor 58. The temperature sensor 58 may be located fluidly upstream of the de Laval-nozzle 46, and fluidly downstream of the evaporator 32. Additionally, the temperature sensor 58 may be configured to measure temperature of the working fluid 28 and transmit a working fluid temperature signal 60. In one embodiment, the pressure sensor 54 and/or the temperature sensor 58 may be operatively associated with the working fluid conduit 30 between the turbine expander 34 and the evaporator 32. Alternatively, and turning to FIG. 3, the turbine expander 34 may include a housing 62 at least partially defining a plenum 64 upstream of the de Laval-nozzle 46. Accordingly, in such an embodiment, the pressure sensor 54 and/or the temperature sensor 58 may be operatively associated with the plenum 64.

Returning to FIGS. 1 and 2, the electronic controller 22 may be further configured to receive the working fluid temperature signal 60, and calculate the working fluid mass flowrate 52 utilizing the working fluid pressure signal 24 and working fluid temperature signal 60, such as with equation 1 above. Moreover, the electronic controller 22 may be further configured to transmit the working fluid flowrate adjustment signal 26 in response to the working fluid pressure signal 24 and working fluid temperature signal 60 when using equation 1 above, for example. Additionally, the flow control device 38 may be further configured to receive the working fluid flowrate adjustment signal 26 from the electronic controller 22 and alter the working fluid mass flowrate 52 in response to the working fluid flowrate adjustment signal 26.

Figure 4:
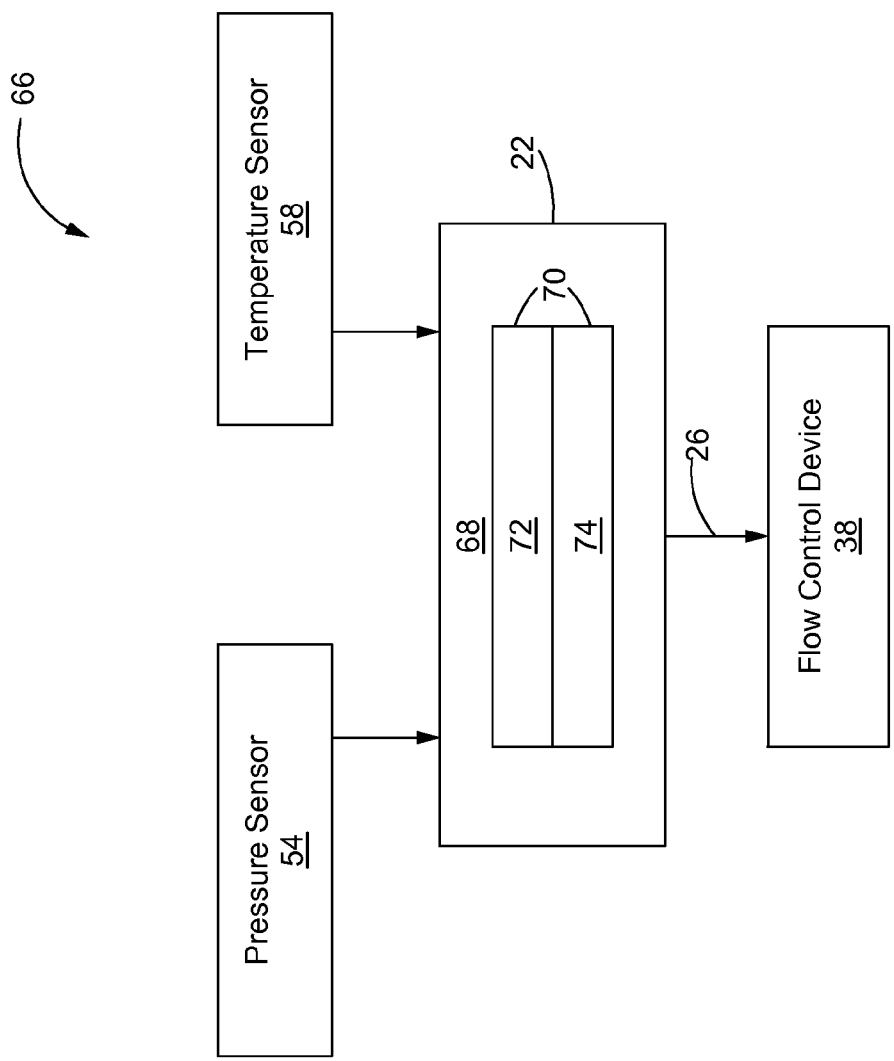
FIG. 4 is a block diagram of an exemplary control system that may be used in conjunction with the waste heat recovery system of FIG. 2.

Turning now to FIG. 4, an exemplary control system that may be utilized with waste heat recovery system 20 disclosed in FIG. 2 is illustrated and is generally referred to by the reference numeral 66. The control system 66 may include the pressure sensor 54 and temperature sensor 58 previously described. Further, as seen in FIG. 4, the pressure sensor 54 and the temperature sensor 58 may each be operatively coupled to the electronic controller 22. Moreover, the pressure sensor 54 may be configured to transmit the working fluid pressure signal 24 to the electronic controller 22, while the temperature sensor 58 may be configured to transmit the working fluid temperature signal 60 to the electronic controller 22. To facilitate such operation, the electronic controller 22 may be implemented to control the operation of the waste heat recovery system 20. More specifically, electronic controller 22 may include a microprocessor 68 for executing specified programs that control and monitor various functions associated with the waste heat recovery system 20, such as receiving the working fluid pressure signal 24, receiving the working fluid temperature signal 60 and calculating the working fluid mass flowrate 52, such as with equation 1 described above. Further, the microprocessor 68 may include a memory 70, such as read only memory (ROM) 72, for storing a program or programs, and a random access memory (RAM) 74 which serves as a working area for use in executing the programs stored in memory 70. For example, equation 1 may be stored in the memory 70. Although microprocessor 68 is shown, it is also possible and contemplated to use other electronic components such as a microcontroller, an ASIC (application specific integrated circuit) chip or any other integrated circuit device.

The electronic controller 22 may be operatively connected to the flow control device 38, such as a pump, valve or other flow controlling apparatus. Further, the electronic controller 22 may transmit the working fluid flowrate adjustment signal 26 to the flow control device 38 calling for the flow control device 38 to increase the flowrate. In response, and when the flow control device 38 is a pump, the pump may increase its speed, thereby increasing the working fluid mass flowrate 52 in the waste heat recovery system 20. Additionally or alternatively, when the flow control device 38 is a valve, the valve may actuate towards an open position thereby increasing the working fluid mass flowrate 52 in the waste heat recovery system 20. Alternatively, the electronic controller 22 may transmit a working fluid flowrate adjustment signal 26 to the flow control device 38 calling for the pump to decrease its speed. In response, the pump may decrease its speed, thereby decreasing the working fluid mass flowrate 52 in the waste heat recovery system 20. Additionally or alternatively, when the flow control device 38 is a valve, the valve may actuate towards a closed position thereby decreasing the working fluid mass flowrate in the waste heat recovery system 20. Alternatively, the electronic controller 22 may determine that adjustment of the working fluid mass flowrate 52 is not required. In this instance, the electronic controller 22 may not transmit a working fluid flowrate adjustment signal 26 to the pump 38.

INDUSTRIAL APPLICABILITY

In operation, the teachings of the present disclosure can find applicability in many industrial applications, such as, but not limited to, use in the waste heat recovery system 20 for an engine system 10 supplying power to an automobile, on-highway truck, an off-highway truck, marine vehicle, electric generator, pump or the like. Engine 12 may be, for example, a gas turbine engine, a spark ignition engine or a compression ignition engine such as a diesel engine, or other compression ignition engine known in the art.

Figure 5:
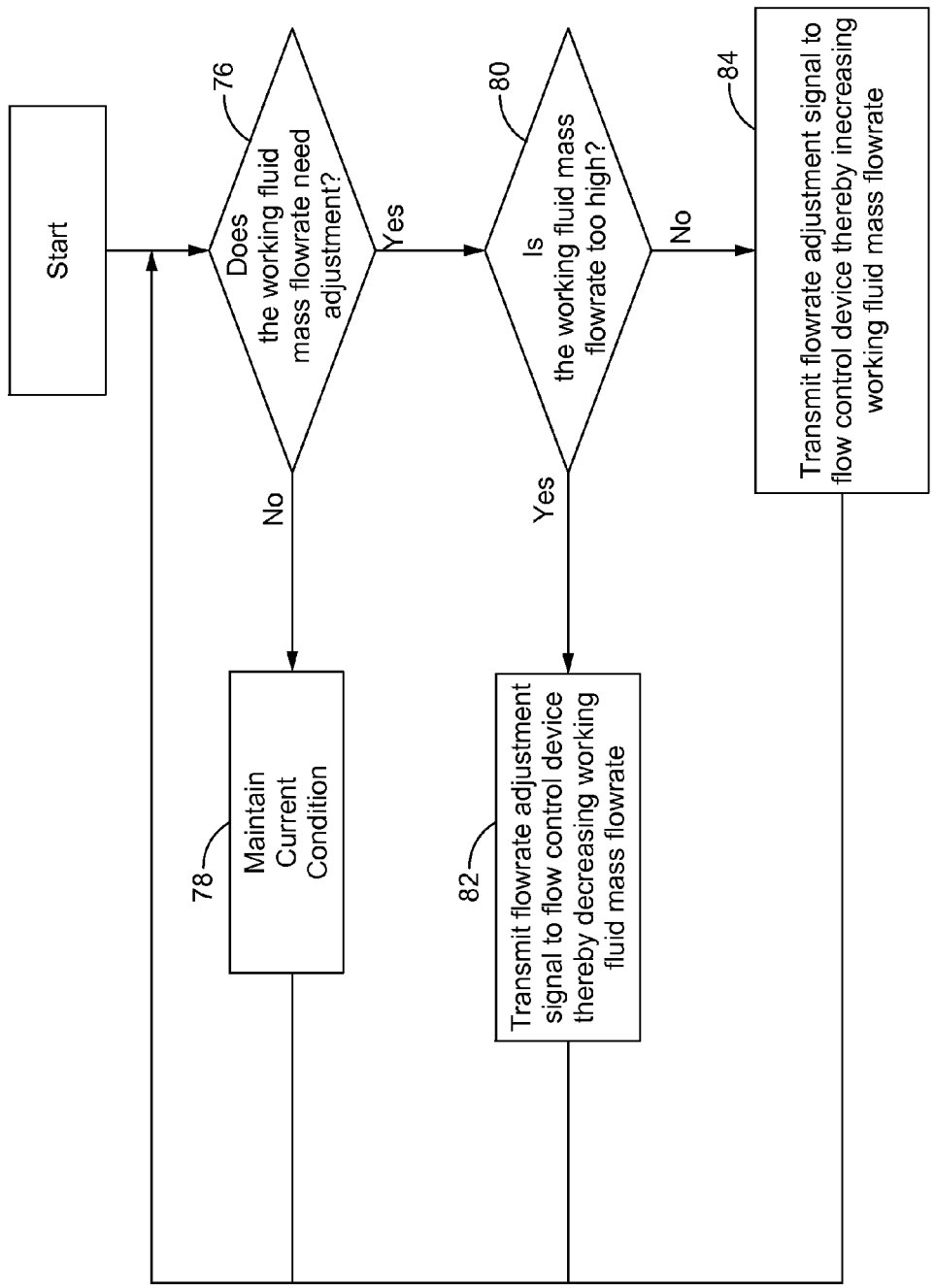
FIG. 5 is a flowchart illustrating exemplary steps of a method for operating a waste heat recovery system of FIGS. 2 and 3 with the control system of FIG. 4 according to another aspect of the present disclosure.

Referring now to FIG. 5, an exemplary flowchart is shown depicting a sample sequence of steps which may be followed to operate a waste heat recovery system 20 utilizing the waste heat recovery system 20 and control system 66 of the present disclosure. Step 76 of the method may include determining whether working fluid mass flowrate 52 needs adjustment. For example, as described above, the pressure sensor 54 may measure the pressure of the working fluid 28 upstream of the de Laval-nozzle 46 and transmit a working fluid pressure signal 24 to the electronic controller 22. Further, the temperature sensor 58 may measure the pressure of the working fluid 28 upstream of the de Laval-nozzle 46 and transmit a working fluid temperature signal 60 to the electronic controller 22. The electronic controller 22 may calculate the working fluid mass flowrate 52, with equation 1 for example, and compare the calculated value to a value stored in the memory 70. If the electronic controller 22 determines the working fluid mass flowrate 52 does not require adjustment, then the current conditions may be maintained at step 78 and the method may return to step 76.

However, if the working fluid mass flowrate 52 does need adjustment, then the electronic controller 22 may determine if the working fluid mass flowrate 52 is too high at step 80. If the working fluid mass flowrate 52 is too high, then the electronic controller 22 may transmit a working fluid flowrate adjustment signal 26 to the flow control device 38 calling for the flow control device 38 to decrease speed or actuate towards a closed position, thereby decreasing the working fluid mass flowrate 52 at step 82. Subsequently, the method may return to step 76.

However, if the working fluid mass flowrate 52 is too low, then the electronic controller 22 may transmit a working fluid flowrate adjustment signal 26 to the flow control device 38 calling for the pump to increase its speed or valve to actuate towards an open position at step 84 thereby increasing the working fluid mass flowrate 52. Subsequently, the method may return to step 76.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A waste heat recovery system, comprising:
    a turbine expander, the turbine expander including a turbine blade, the turbine blade rotatably coupled to a shaft, the shaft rotatably engaged with a nozzle ring, the nozzle ring including a de Laval-nozzle;
    a pressure sensor, the pressure sensor located fluidly upstream of the de Laval-nozzle and fluidly downstream of an evaporator, the pressure sensor configured to measure pressure of a working fluid and transmit a working fluid pressure signal; and
    an electronic controller, the electronic controller configured to receive the working fluid pressure signal, calculate a working fluid mass flowrate utilizing the working fluid pressure signal, determine whether the working fluid mass flow rate requires adjustment based on the calculated working mass flowrate, and transmit a working fluid flowrate adjustment signal in response to determining that the working fluid mass flow rate requires adjustment.

2. The waste heat recovery system according to claim 1, further including a temperature sensor located fluidly upstream of the de Laval-nozzle and fluidly downstream of the evaporator, the temperature sensor being configured to measure temperature of the working fluid and transmit a working fluid temperature signal, and the electronic controller being further configured to receive the working fluid temperature signal, calculate a working fluid mass flowrate utilizing the working fluid pressure signal and the working fluid temperature signal, and transmit the working fluid flowrate adjustment signal in response to the working fluid pressure signal and the working fluid temperature signal.

3. The waste heat recovery system according to claim 2, further including a flow control device, the flow control device configured to receive the working fluid flowrate adjustment signal and alter the working fluid mass flowrate in response to the working fluid flowrate adjustment signal.

4. The waste heat recovery system according to claim 3, the electronic controller being configured to calculate the working fluid mass flowrate utilizing the working fluid pressure signal and the working fluid temperature signal in an equation, $$\dot{m} = CA\sqrt{k\rho_0 P_0 \left(\frac{2}{k+1}\right)^{\left(\frac{k+1}{k-1}\right)}},$$

where $\dot{m}$ is a working fluid mass flowrate, C is a dimensionless discharge coefficient, A is a discharge hole cross-sectional area of the de Laval-nozzle, k is a $C_p/C_v$ of the working fluid, $C_p$ is a specific heat of the working fluid at constant pressure, $C_v$ is a specific heat of the working fluid at constant volume, $\rho_0$ is a density of the working fluid at total pressure $P_0$ and total temperature $T_0$, $P_0$ is a pressure of the working fluid upstream of the de Laval-nozzle and $T_0$ is the temperature of the working fluid upstream of the de Laval-nozzle.

5. The waste heat recovery system according to claim 2, further including a working fluid conduit configured to transport the working fluid, the pressure sensor being operatively associated with the working fluid conduit between the turbine expander and the evaporator.

6. The waste heat recovery system according to claim 5, the temperature sensor being operatively associated with the working fluid conduit between the turbine expander and the evaporator.

7. The waste heat recovery system according to claim 2, the turbine expander further including a housing, the housing at least partially defining a plenum upstream of the de Laval-nozzle for the working fluid, the pressure sensor being operatively associated with the plenum.

8. The waste heat recovery system according to claim 7, the temperature sensor being operatively associated with the plenum.

9. The waste heat recovery system according to claim 1, the evaporator being in thermal communication with an exhaust stream and configured to absorb thermal energy of the exhaust stream and transfer the thermal energy to the working fluid.

10. An engine system, comprising:
    an engine;
    an exhaust conduit downstream of and fluidly coupled to the engine configured to transport an exhaust stream away from the engine;
    an evaporator, the evaporator in thermal communication with the exhaust stream;
    a turbine expander, the turbine expander including a nozzle ring, the nozzle ring including a de Laval-nozzle;
    a working fluid conduit, the working fluid conduit fluidly coupling the evaporator with the turbine expander;
    a pressure sensor, the pressure sensor operatively associated with the working fluid conduit, the pressure sensor positioned between the evaporator and the de Laval-nozzle, the pressure sensor configured to measure pressure of a working fluid in the working fluid conduit and convey a working fluid pressure signal;
    an electronic controller, the electronic controller configured to receive the working fluid pressure signal, calculate a working fluid mass flow rate utilizing the working fluid pressure signal, determine whether the working fluid mass flow rate requires adjustment based on the calculated working mass flowrate, and convey a working fluid flowrate adjustment signal in response to determining that the working fluid mass flowrate requires adjustment.

11. The engine system according to claim 10, further including a temperature sensor operatively associated with the working fluid conduit, the temperature sensor positioned between the evaporator and the de Laval-nozzle, the temperature sensor being configured to measure temperature of the working fluid in the working fluid conduit and convey a working fluid temperature signal, and wherein the electronic controller is further configured to receive the working fluid temperature signal, calculate a working fluid mass flowrate utilizing the working fluid pressure signal and the working fluid temperature signal, and transmit the working fluid flowrate adjustment signal in response to the working fluid pressure signal and the working fluid temperature signal.

12. The engine system according to claim 11, further including a flow control device fluidly downstream of the turbine expander and fluidly upstream of the evaporator, the working fluid conduit fluidly coupling the turbine expander with the flow control device, the working fluid conduit fluidly coupling the flow control device with the evaporator, the flow control device being configured to receive the working fluid flowrate adjustment signal and alter the working fluid mass flowrate in response to the working fluid flowrate adjustment signal.

13. A method of operating a waste heat recovery system, comprising:
locating a pressure sensor fluidly upstream of a de Laval-nozzle of a turbine expander, and fluidly downstream of an evaporator, the pressure sensor configured to measure pressure of a working fluid and transmit a working fluid pressure signal, the turbine expander including a turbine blade, the turbine blade rotatably coupled to a shaft, the shaft rotatably engaged with a nozzle ring, the nozzle ring including de Laval-nozzle;
locating a temperature sensor fluidly upstream of the de Laval-nozzle of the turbine expander, and fluidly downstream of the evaporator, the temperature sensor configured to measure temperature of the working fluid and transmit a working fluid temperature signal;
configuring an electronic controller to receive the working fluid pressure signal and the working fluid temperature signal, calculate a working fluid mass flowrate utilizing the working fluid pressure signal and the working fluid temperature signal, determine whether the working fluid mass flowrate requires adjustment based on the calculated working mass flowrate, and transmit a working fluid flowrate adjustment signal in response to determining that the working fluid mass flowrate requires adjustment;
configuring a flow control device to receive the working fluid flowrate adjustment signal and alter the working fluid mass flowrate in response to the working fluid flowrate adjustment signal;
determining whether the working fluid flowrate needs adjustment; and
transmitting the working fluid flowrate adjustment signal to the flow control device when the working fluid mass flowrate needs adjustment.

14. The method of operating the waste heat recovery system according to claim 13, further including configuring the electronic controller to calculate the working fluid mass flowrate utilizing the working fluid pressure signal and the working fluid temperature signal in an equation, $$\dot{m} = CA\sqrt{k\rho_0 P_0 \left(\frac{2}{k+1}\right)^{\left(\frac{k+1}{k-1}\right)}},$$

where $\dot{m}$ is a working fluid mass flowrate, C is a dimensionless discharge coefficient, A is a discharge hole cross-sectional area of the de Laval-nozzle, k is a $C_p/C_v$ of the working fluid, $C_p$ is a specific heat of the working fluid at constant pressure, $C_v$ is a specific heat of the working fluid at constant volume, $\rho_0$ is a density of the working fluid at total pressure $P_0$ and total temperature $T_0$, $P_0$ is a pressure of the working fluid upstream of the de Laval-nozzle and $T_0$ is the temperature of the working fluid upstream of the de Laval-nozzle.

15. The method of operating the waste heat recovery system according to claim 13 further including operatively associating the pressure sensor and the temperature sensor with a working fluid conduit between the turbine expander and the evaporator.

* * * * *